United States Patent
Joycey et al.

(10) Patent No.: US 6,722,316 B1
(45) Date of Patent: Apr. 20, 2004

(54) DOG TREADMILL

(76) Inventors: John G. Joycey, 18 Luxton Avenue, Winnipeg, Manitoba (CA), R2W 0L9; David Joycey, 405 Morley Avenue, Winnipeg, Manitoba (CA), R3L 0Y7

(*) Notice: Subject to any disclaimer, the term of this patent is extended or adjusted under 35 U.S.C. 154(b) by 0 days.

(21) Appl. No.: 10/376,984

(22) Filed: Mar. 3, 2003

Related U.S. Application Data

(60) Provisional application No. 60/413,475, filed on Sep. 26, 2002.

(51) Int. Cl.[7] .............................................. A01K 15/02
(52) U.S. Cl. ......................... 119/700; 119/703; 482/54
(58) Field of Search ............................... 119/700, 703, 119/704; 482/54

(56) References Cited

U.S. PATENT DOCUMENTS

| | | | | |
|---|---|---|---|---|
| 2,155,684 A | * | 4/1939 | Richards | 119/700 |
| 3,824,961 A | * | 7/1974 | Webb | 119/700 |
| 4,095,561 A | * | 6/1978 | Ruetenik | 119/700 |
| 4,205,628 A | * | 6/1980 | Null | 119/700 |
| 4,819,583 A | * | 4/1989 | Guerra | 119/700 |
| 5,081,991 A | * | 1/1992 | Chance | 600/411 |
| 5,277,150 A | * | 1/1994 | Rhodes | 119/700 |
| D347,912 S | | 6/1994 | Golden et al. | |
| D350,421 S | | 9/1994 | Brubaker | |
| 6,058,888 A | | 5/2000 | Nichols | |
| 6,347,603 B1 | * | 2/2002 | Felger | 119/700 |

FOREIGN PATENT DOCUMENTS

| | | | | |
|---|---|---|---|---|
| WO | WO 85/04073 A1 | * | 9/1985 | A01K/15/02 |

* cited by examiner

*Primary Examiner*—Charles T. Jordan
*Assistant Examiner*—John W. Zerr
(74) *Attorney, Agent, or Firm*—Adrian D. Battison; Michael R. Williams; Ryan W. Dupuis

(57) ABSTRACT

A dog is exercised on a conventional a treadmill by locating the dog on the treadmill by providing a support base mounted on the ground underneath the base of the treadmill and held in place by the base of the treadmill and an upstanding support member extending from the support base at the front end of the treadmill, and confining the dog within an enclosure supported in cantilever manner by the support member and extending rearwardly therefrom so as to be supported by the support member over the walking surface such that the dog is positioned within the enclosure on the walking surface. The enclosure has a front wall and side walls extending from a bottom edge close the walking surface and within the side edges thereof to a height above the dog to restrict its vision.

21 Claims, 4 Drawing Sheets

Pet-cerciser Side View

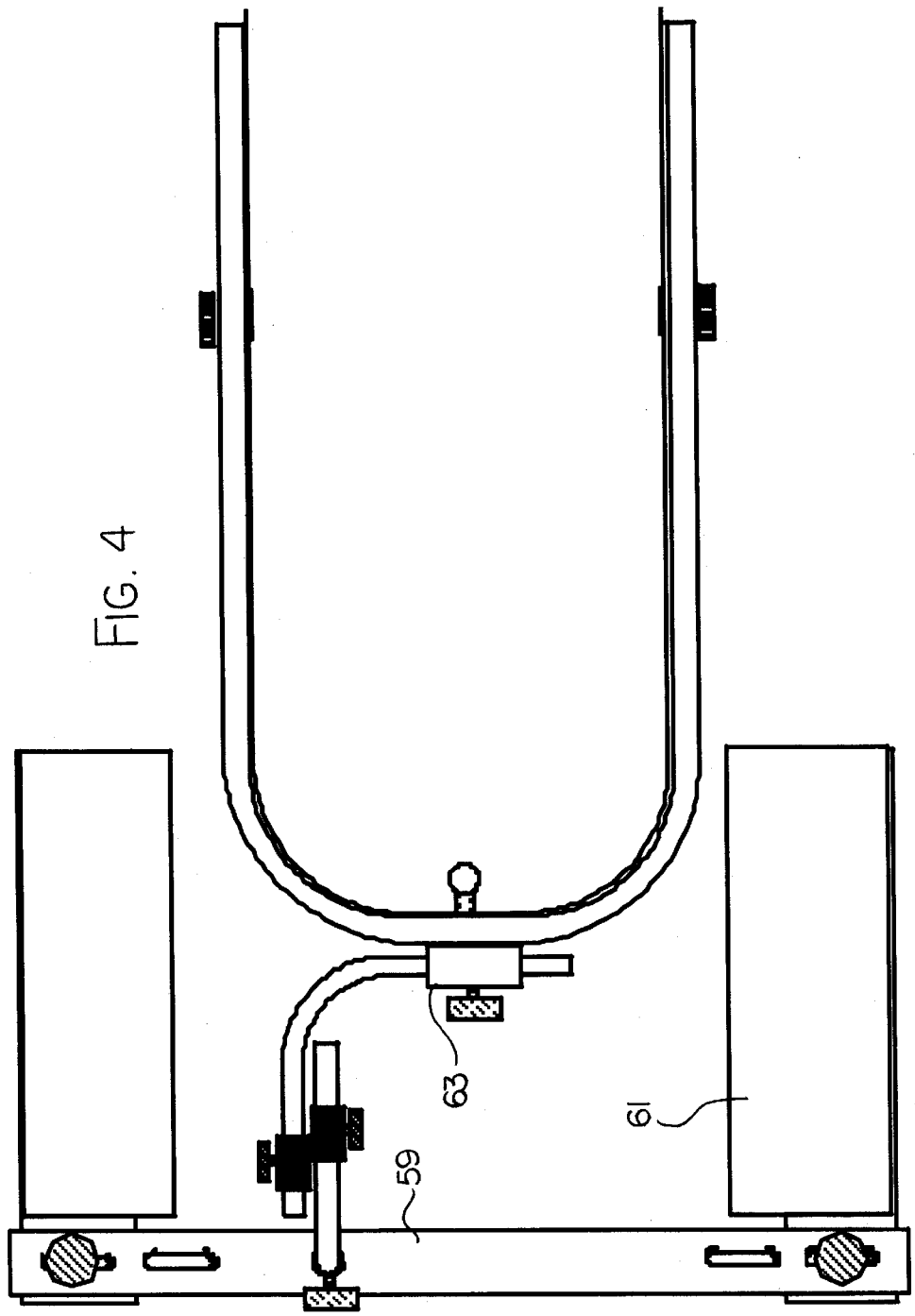

DOG TREADMILL

This application claims priority under 35 U.S.C. 119 from Provisional Application No. 60/413,475, filed Sep. 26th 2002.

FIELD OF THE INVENTION

The present invention relates to a treadmill for use in providing animals, more particularly dogs, with a suitable exercise device.

BACKGROUND OF THE INVENTION

The concept of providing a treadmill useable by dogs is well known in the patent literature for providing the required exercise for the dog without the necessity of the owner being obligated to exercise with the dog but suitable devices are not available in practice.

Examples of such treadmill type devices are shown in the following prior patents. U.S. Pat. No. 6,058,888 (Nichols) provides a first device of this type. However, it does not effectively control and locate the dog in that a standard technique employed by trainers to dominate an aggressive or overtly dominant dog is to stand over it with a leg on either side and lift the dog from under its chest. This upward pulling motion causes the dog to know that it is being dominated this device acts to hold the dog in a similarly dominant manner while forcing it to remain on the treadmill. Excessively nervous dogs may never be able to relax and enjoy exercise in this situation. Also the device leaves the dog completely exposed on all sides, which is a further aggravating factor for a nervous dog. It is left feeling completely vulnerable. Again, an excessively nervous dog may simply never relax in this situation. The device also secures only the front of the dog. A large dog could easily swing its hind end off the treadmill thus risking injury.

U.S. Des. Pat. No. 350,421 (Brubaker) and U.S. Des. Pat. No. 347,912 (Golden et al) show devices which are designed or dedicated solely for exercising dogs as opposed to extending the use of a treadmill designed for human usage to accommodate usage by dogs.

SUMMARY OF THE INVENTION

The present invention provides a space on a standard treadmill in within which a dog can feel safe and be safe.

The present invention provides a dog exercise device comprising:

a treadmill having a base for supporting the treadmill on a ground surface with a front end and a rear end and a generally horizontal walking surface on the base extending from a forward edge adjacent the front end of the base to a rearward edge adjacent the rear end of the base and including two side edges;

and a confining device for locating the dog on the treadmill comprising:

a support base arranged to be mounted on the ground underneath the base of the treadmill and to be held in place by the base of the treadmill;

an upstanding support member extending from the support base at the front end of the treadmill, and;

an enclosure for confining the dog supported by the support member and extending rearwardly therefrom so as to be supported by the support member over the walking surface such that the dog is positioned within the enclosure on the walking surface.

Preferably the support member is removable from the base.

Preferably the support member comprises an arm generally upstanding from the base.

Preferably the enclosure includes a front wall and side walls extending from the front edge of the walking surface toward the rear edge Preferably the front wall and the side walls have bottom edges closely adjacent the walking surface.

Preferably bottom edges of the side walls are spaced inwardly from the side edges of the walking surface.

Preferably the enclosure includes an open portion at the rear end.

Preferably the enclosure is supported solely by the base and the support member in cantilever arrangement.

Preferably the enclosure is moveable on the support member.

Preferably the enclosure is moveable on the support member in a forward and rearward direction for adjustment of the position of the front wall relative to the front edge.

Preferably the enclosure is removable for replacement.

Preferably the front wall and the side walls have a common height defining a common top edge.

Preferably the front wall and the side walls have a height above the height of the dog so that the vision of the dog is restricted by the walls.

Preferably there is a tether for the dog within the enclosure.

According to a second aspect of the invention there is provided a method for exercising a dog comprising:

providing a treadmill having a base for supporting the treadmill on a ground surface with a front end and a rear end and a generally horizontal walking surface on the base extending from a forward edge adjacent the front end of the base to a rearward edge adjacent the rear end of the base and including two side edges;

and locating the dog on the treadmill by providing:

a support base mounted on the ground underneath the base of the treadmill and held in place by the base of the treadmill;

an upstanding support member extending from the support base at the front end of the treadmill, and;

confining the dog within an enclosure supported by the support member and extending rearwardly therefrom so as to be supported by the support member over the walking surface such that the dog is positioned within the enclosure on the walking surface.

BRIEF DESCRIPTION OF THE DRAWINGS

One embodiment of the invention will now be described in conjunction with the accompanying drawings in which:

FIG. 4 is a top plan view of the second embodiment shown in FIG. 3.

In the drawings like characters of reference indicate corresponding parts in the different figures.

DETAILED DESCRIPTION

Figure 1:
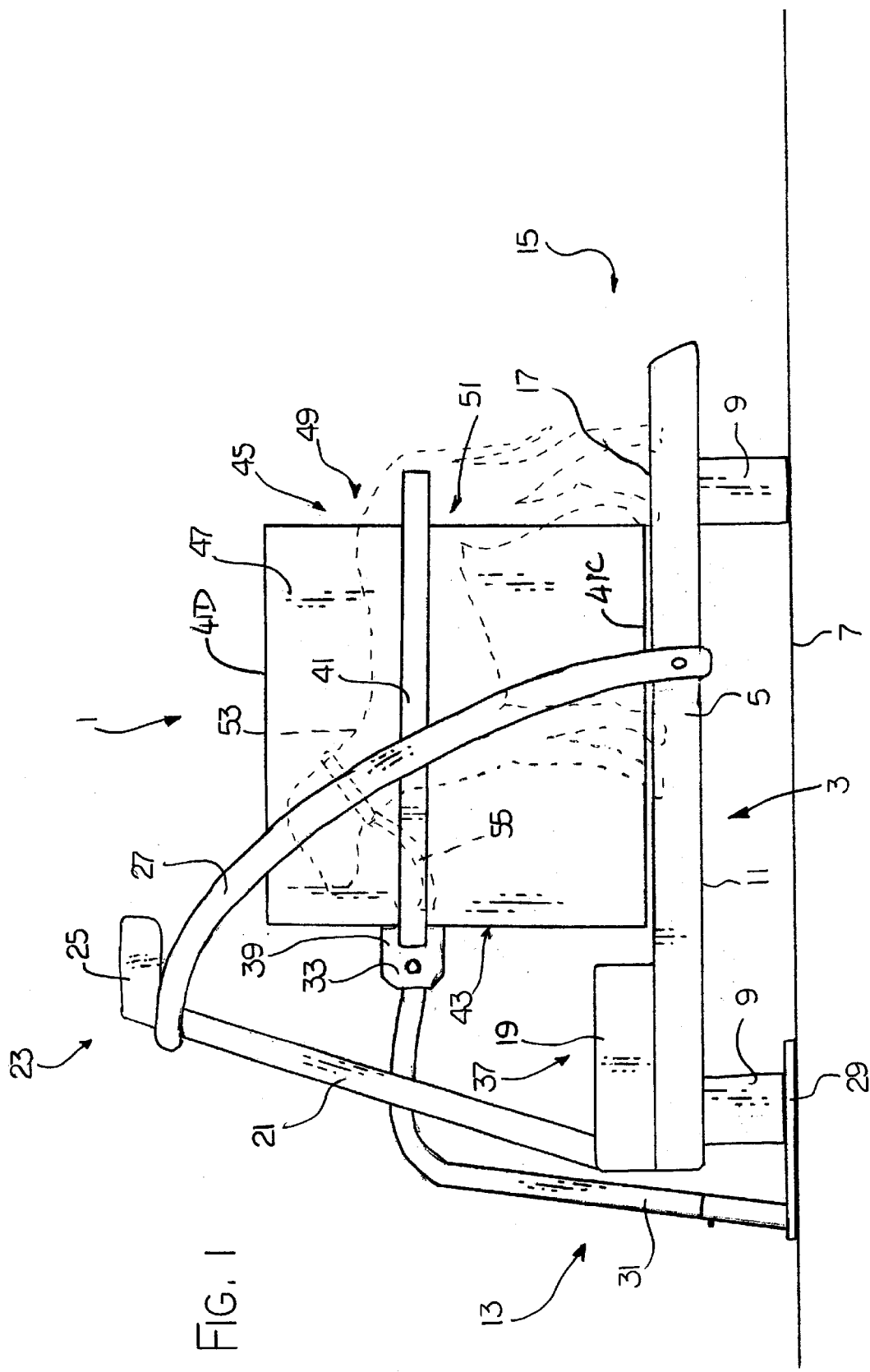
FIG. 1 is a side elevational view of one embodiment of the present invention.

As illustrated in FIG. 1 a exercise device for dogs 1 is arranged to be used with a conventional treadmill 3. The treadmill has a base 5 which is supported on a ground surface 7 by support members 9 which extend from a bottom side 11 of the base. The base has a front end 13 and a rear end 15. On the top side of the base is a walking surface 17, as found on conventional treadmills, which is arranged to be driven by a motor 19 such that the surface simulates walking or jogging. Extending from the front end of the base is a display stand 21 which supports at a top end 23 of the stand is a control/display panel 25. Extending from the top end of the stand is a handle 27. The handle extends downwards on either side of the walking surface and is mounted to respective sides of the base.

Figure 2:
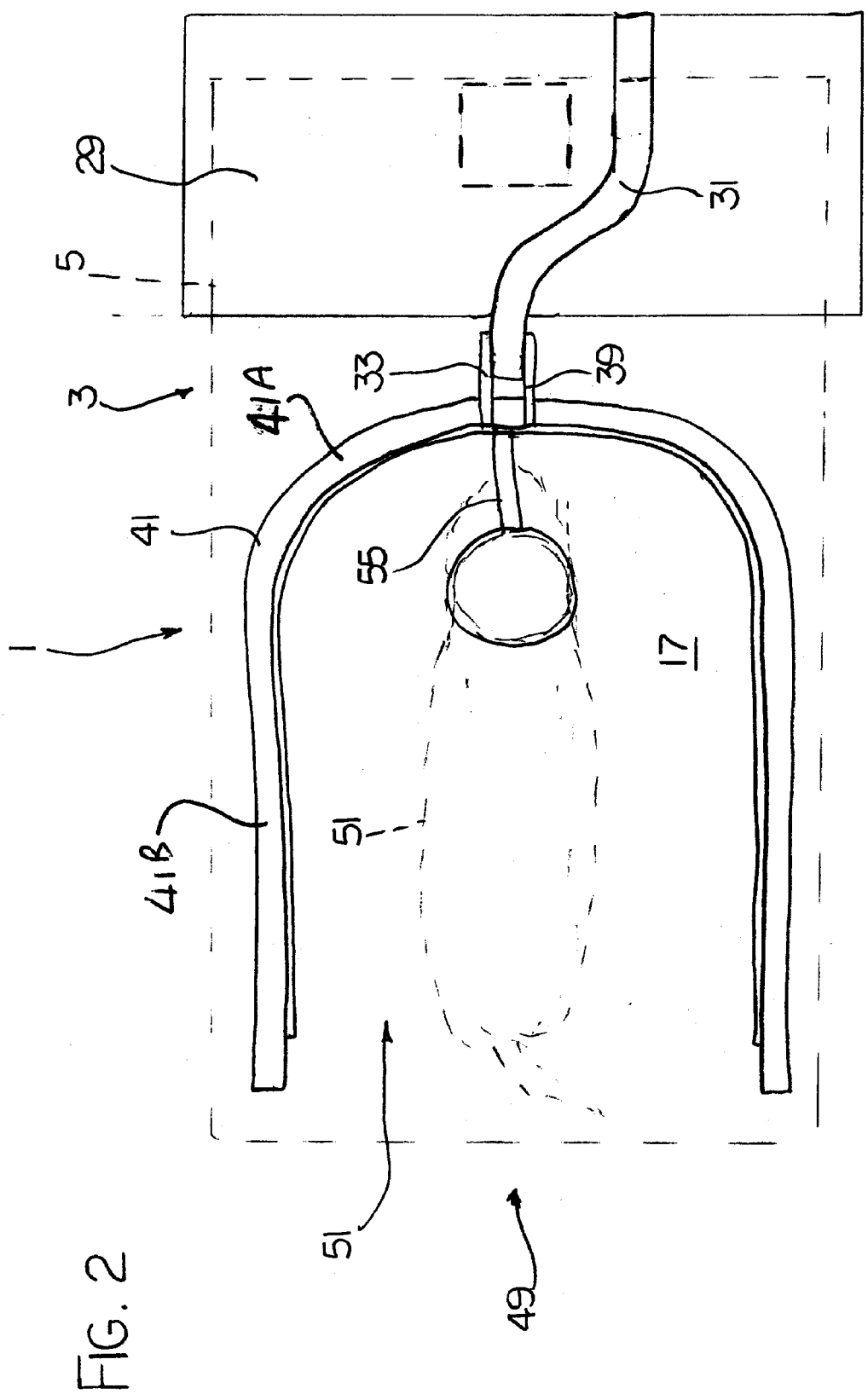
FIG. 2 is a top plan view of the embodiment of FIG. 1.

The device as shown in FIGS. 1 and 2 has a base plate 29 which is arranged to be positioned beneath the support members at the front end of the base. Extending upwards in front of the base is a substantially vertical arm 31. The arm is removable from the base plate so as to be easily removed when not in use. The arm extends upwardly and rearwards above the motor on the front end of the base as well as around or beside the display stand. The arm further extends rearwards of the stand and has a mounting portion 33 at the further most end of the arm. The mounting portion is located between a front end 37 of the walking surface adjacent the front end of the base and the control/display panel. The mounting portion has two vertical orientated plates 39 which are parallel and are fastened to respective sides of the arm. The plates are fastened to a wall support 41. The wall support extends horizontally from each side of the plates such that a front portion 43 of the wall support extends across the walking surface. The wall support extends rearwards spaced vertically from the walking surface along each side of the walking surface within the handle. The wall support extends to the rear end of the walking surface and has an open portion 45 for providing access to the walking surface. Mounted within the inner side of the wall mount is a wall 47 which provides an enclosure 49 around the walking surface and an open rear portion 51 at the rear end of the walking surface. The wall is spaced from the walking surface and is positioned such that a dog 53 can be fastened by the dogs leash 55 to the wall support and enclosed therein on the walking surface.

The enclosure contains the dog safely on the treadmill and promotes a sense of safety from the dogs perspective. Using opaque walls until the dog is comfortable eliminates all external distractions and enables even the most nervous dog to focus on the single moving component of the treadmill, the walking surface. Once the dog is used to the device, the opaque sides may be replaced with a transparent wall enabling the dog to focus on other things and avoiding boredom.

Figure 3:
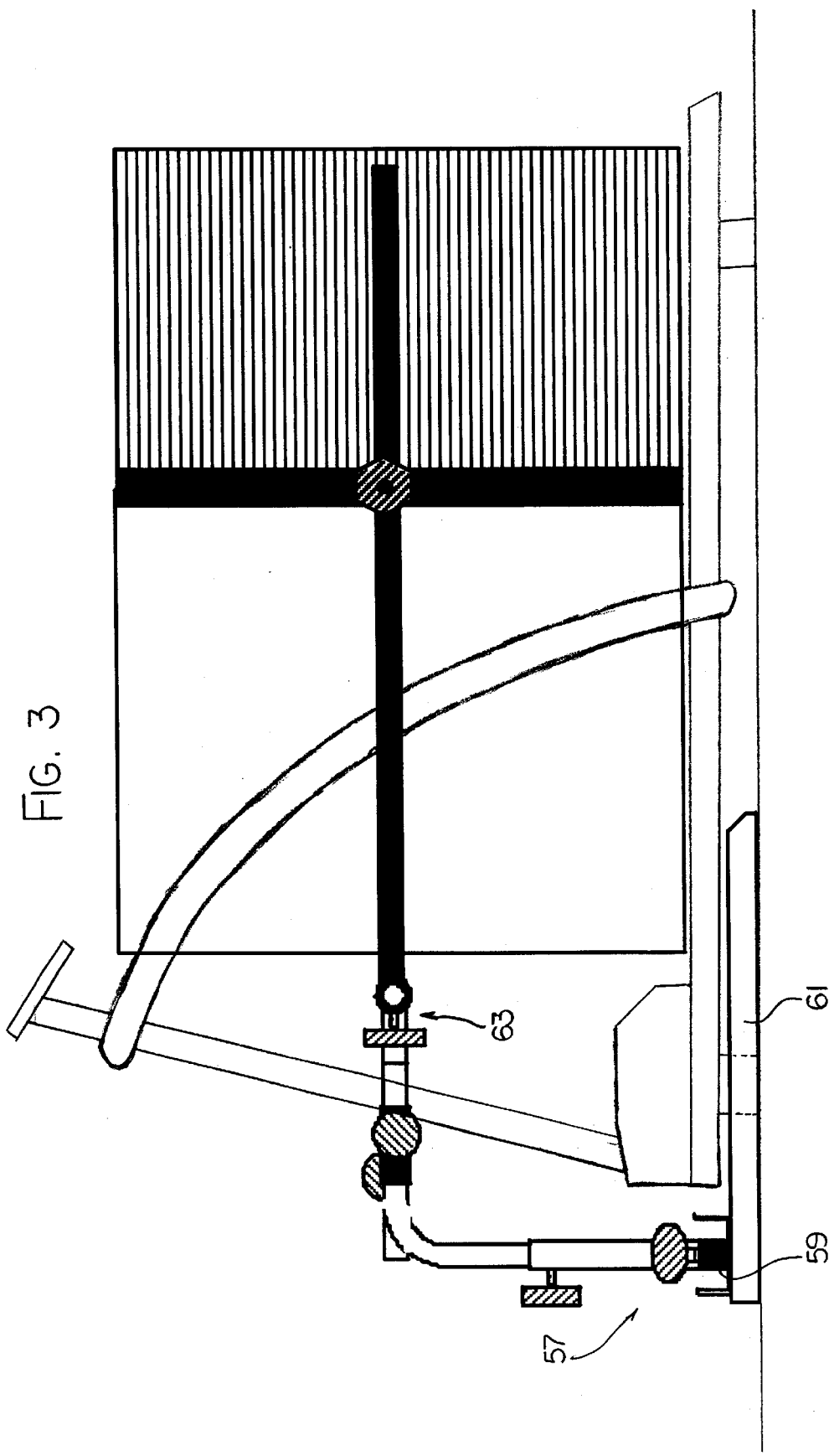
FIG. 3 is a side elevational view of a second embodiment of the present invention.

FIGS. 3 and 4 show an preferred embodiment of the present invention wherein a front end 57 of the device has a cross member 59. The cross member is arranged to be positioned across the length of the front of the treadmill perpendicular to the walking surface. Extending parallel from respective ends of the cross member are U-shaped channels 61 which are arranged to extend beneath the base of the treadmill. The channels are adjustable in a side to side direction on the cross member such that the channels can be positioned beneath the support members of the base.

FIGS. 3 and 4 show another embodiment of the present invention where in a clamp member 63. The clamp member is attached to the wall support and is arranged to fasten to the arm so as to provide adjustment to the positioning of the enclosure on the walking surface.

The device as shown above has the following features:

The support member 31 is removable from the base 29.

The enclosure includes a front wall 41A and side walls 41B extending from the front edge of the walking surface toward the rear edge The front wall 41A and the side walls 41B have bottom edges 41C closely adjacent the walking surface 17 so that the animal is prevented from catching a foot or leg therebetween.

The bottom edges 41C of the side walls 41B are spaced inwardly from the side edges of the walking surface.

The device enclosure includes an open portion at the rear end.

The enclosure is supported solely by the base 29 and the support member 31 in cantilever arrangement.

The enclosure is moveable on the support arm 31 in a forward and rearward direction at an adjustment clamp (not shown) between two sections of the arm 31 for adjustment of the position of the front wall relative to the front edge.

The front wall 41A and the side walls 41B have a common height defining a common top edge 41D and have a height above the height of the dog so that the vision of the dog is restricted by the walls.

There is a tether 55 for the dog within the enclosure.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A dog exercise device comprising:
    a treadmill having a base for supporting the treadmill on a ground surface with a front end and a rear end and a generally horizontal walking surface on the base extending from a forward edge adjacent the front end of the base to a rearward edge adjacent the rear end of the base and including two side edges;
    and a confining device for locating the dog on the treadmill comprising:
        a support base arranged to be mounted on the ground underneath the base of the treadmill such that a portion of the base of the treadmill rest upon the support base so that the support base is held in place by the base of the treadmill;
        an upstanding support member extending from the support base at the front end of the treadmill, and;
        an enclosure for confining the dog supported by the support member and extending rearwardly therefrom so as to be supported by the support member over the walking surface such that the dog is positioned within the enclosure on the walking surface.

2. The device according to claim 1 wherein the support member is removable from the support base.

3. The device according to claim 1 wherein the support member comprises an arm generally upstanding from the support base.

4. The device according to claim 1 wherein the enclosure includes a front wall and side walls extending from the forward edge of the walking surface toward the rearward edge.

5. The device according to claim 4 wherein the front wall and the side walls have bottom edges closely adjacent the walking surface.

6. The device according to claim 4 wherein bottom edges of the side walls are spaced inwardly from the side edges of the walking surface.

7. The device according to claim 1 wherein the enclosure includes an open portion at a rear end of the enclosure.

8. The device according to claim 1 wherein the enclosure is supported solely by the support base and the support member in cantilever arrangement.

9. The device according to claim 1 wherein the enclosure is moveable on the support member.

10. The device according to claim 4 wherein the enclosure is moveable on the support member in a forward and rearward direction for adjustment of the position of the front wall relative to the forward edge.

11. The device according to claim 1 wherein the enclosure is removable for replacement.

12. The device according to claim 4 wherein the front wall and the side walls have a common height defining a common top edge.

13. The device according to claim 4 wherein the front wall and the side walls have a height above the height of the dog so that the vision of the dog is restricted by the walls.

14. The device according to claim 1 wherein there is a tether for the dog within the enclosure.

15. A method for exercising a dog comprising:

providing a treadmill having a base for supporting the treadmill on a ground surface with a front end and a rear end and a generally horizontal walking surface on the base extending from a forward edge adjacent the front end of the base to a rearward edge adjacent the rear end of the base and including two side edges;

and locating the dog on the treadmill by providing:

a support base mounted on the ground underneath the base of the treadmill such that a portion of the base of the treadmill rest upon the support base so that the support base is held in place by the base of the treadmill;

an upstanding support member extending from the support base at the front end of the treadmill, and;

confining the dog within an enclosure supported by the support member and extending rearwardly therefrom so as to be supported by the support member over the walking surface such that the dog is positioned within the enclosure on the walking surface.

16. The method according to claim 15 wherein the enclosure includes a front wall and side walls extending from the forward edge of the walking surface toward the rearward edge.

17. The method according to claim 16 wherein the front wall and the side walls have bottom edges closely adjacent the walking surface.

18. The method according to claim 16 wherein bottom edges of the side walls are spaced inwardly from the side edges of the walking surface.

19. The method according to claim 15 wherein the enclosure is supported solely by the support base and the support member in cantilever arrangement.

20. The method according to claim 16 wherein the front wall and the side walls have a common height defining a common top edge.

21. The method according to claim 16 wherein the front wall and the side walls have a height above the height of the dog so that the vision of the dog is restricted by the walls.

* * * * *